United States Patent [19]
Scott et al.

[11] Patent Number: 5,489,169
[45] Date of Patent: Feb. 6, 1996

[54] VERTICAL BROACHING MACHINE

[75] Inventors: Daniel G. Scott, Bolingbrook; Richard M. Brosig, Downers Grove, both of Ill.

[73] Assignee: Lovejoy, Inc., Downers Grove, Ill.

[21] Appl. No.: 373,015

[22] Filed: Jan. 17, 1995

[51] Int. Cl.⁶ .............................. B23D 37/00; B23Q 3/06
[52] U.S. Cl. ........................................... 409/244; 409/277
[58] Field of Search .................................... 409/244, 276, 409/277, 278, 259, 283, 286, 265, 264, 267

[56] References Cited

U.S. PATENT DOCUMENTS

| | | | |
|---|---|---|---|
| 1,233,373 | 7/1917 | LaPointe | 409/278 |
| 2,292,440 | 8/1942 | Goteberg | 409/276 |
| 2,431,343 | 11/1947 | Pisarelli | 409/278 |
| 3,550,504 | 12/1970 | Fulks | 409/265 |
| 4,266,894 | 5/1981 | Zuzanov et al. | 409/283 |

FOREIGN PATENT DOCUMENTS

| | | | |
|---|---|---|---|
| 520123 | 12/1992 | European Pat. Off. | 409/286 |
| 751530 | 7/1980 | U.S.S.R. | 409/276 |

Primary Examiner—William Briggs
Attorney, Agent, or Firm—Knechtel, Demeur & Samlan

[57] ABSTRACT

A broaching machine for cutting keyways in a bore of a piece part. There is a stationary bed plate on which is slidably mounted a moveable vise which slides along the bed plate. The jaws of the moveable vise clamp the piece part which is to be machined. A broach holder lowers the broach through an upper fixed support which has upper broach guide means disposed therein. The broach then passes through the piece part and through a lower broach guide means positioned in the bed plate. A broach pulling unit receives the bottom of the broach and reciprocates the broach in an up and down vertical cutting operation. The broach is maintained in position and alignment by means of the upper and lower broach guide means which are disposed above and below the piece part. The upper and lower broach guide means are removable and replaceable after a predetermined amount of wear has occurred. The piece part is moved into the cutting teeth of the broach a predetermined amount to remove the material from the piece part in the keyway cutting operation. A single broach is thus capable of cutting various depth keyways by controlling the amount of movement of the vise along the bed plate.

12 Claims, 2 Drawing Sheets

VERTICAL BROACHING MACHINE

BACKGROUND AND SUMMARY OF THE INVENTION

The present invention relates in general to vertical broaching machines and, more particularly, to a vertical broaching machine having a single broach.

When machining keyways for cylindrical objects such as hubs or couplings, it is necessary to have the broach pass through the center of the work piece. Then, either the broach is moved to remove metal from the work piece or the broach is held stationary and the work piece is moved with respect to the broach. Broaching machines of this type generally have the broach holder positioned above the work piece and a broach pulling unit below the work piece which grabs the bottom of the broach and causes the vertical movement of the broach by means of a mechanized pulling unit.

One example of a vertical broaching machine which does not use a pulling unit is illustrated in U.S. Pat. No. 4,266,894. In this device, the broach passes through the center of the blank to be machined and performs the cutting operation. The broach is then withdrawn back through the machined work piece and a new work piece is then inserted into the proper location to perform the same operation. All of the guides which are utilized to maintain the broach in a vertical relationship with respect to the bore of the work piece are positioned above the work piece. It would be advantageous if guides could be positioned below the work piece to maintain the broach and mandrel in a perfectly vertical orientation. However, this is not provided for in the '894 patent.

Another vertical broaching machine is illustrated in U.S. Pat. No. 5,184,985. This broaching machine illustrates a machine having multiple broaches held in a broach head. The broaches are utilized to machine holes in a plate for steam generators. The broach holder and broach pulling unit are both placed on a slide mechanism which provides for the movement of the broach head and pulling unit along a horizontal axis. In addition, the work piece can be moved along a horizontal axis which is perpendicular to the movement of the broach head. This mechanism is extremely complicated and expensive in order to accurately control the movement of the broach holder and pulling unit with respect to the work piece. Although this machine is particularly well adapted for machining multiple holes in a large work piece, it is not particularly well adapted for machining a single keyway in an individual work piece. The reason is that it would be cost prohibitive to use such a sophisticated device to machine individual keyways in singular work pieces. Furthermore, there is no provision to accurately maintain and guide the broach in a vertical position while cutting the metal.

Another patent is U.S. Pat. No. 5,183,374 which illustrates a horizontal broach mounted on a standard which itself moves along a horizontal axis. The broach also can move up and down along a vertical axis. In the '374 patent, the tool itself moves but the work piece does not. The broach itself is not supported at both ends to maintain it in alignment during the broaching operation.

A problem with all of the prior art devices is that they do not provide a relatively inexpensive vertical broaching machine which can cut various depth keyways in cylindrical piece parts. Furthermore, none of the other prior art devices provide a vertical broaching machine which provides improved means for maintaining the broach in vertical alignment during the broaching operation.

The broaching machine of the present invention provides a vertical broach which passes through the bore of a piece part to be machined. There is a stationary bed plate upon which is positioned a moveable vise. The vise grips the piece part to be machined. The movement of the vise is accurately controlled by means of a solid state control system. There are upper and lower broach guide means which are disposed above and below the piece part. The broach guide means closely receive the broach during the machining operation. These maintain the broach in vertical alignment with the center bore of the piece part and increase the precision of the material removal during the broaching operation. The piece part is moved away from engagement with the broach teeth each time the broach is raised vertically and back into engagement with the teeth each time the broach is lowered and pulled in its cutting cycle. The piece part is moved out of engagement with the broach upon completion of the broaching operation such that the teeth of the broach do not engage the work piece which may result in inadvertent removal of additional material causing the machined area to be out of tolerance.

OBJECTS AND ADVANTAGES

It is an object of the present invention to provide a vertical broaching machine which has a moveable vise which firmly retains the work piece while being able to move the work piece along a horizontal axis. Another object is to provide a vertical broaching machine which can cut keyways of various depths using the same broach. Yet another object is to provide a moveable vise which can withdraw the work piece from the broach after the broaching operation is completed. An advantage of withdrawing the work piece from the broach is that it prevents the inadvertent removal of material from the work piece causing the machined area of the work piece to maintain its tolerances after the broaching operation has been completed.

Yet another object is to provide a vertical broaching machine which has upper and lower broach guide means positioned above and below the work piece to maintain the broach in alignment with the work piece during the broaching operation. An advantage is that it is easier to maintain permissible tolerances over a wider range of bore sizes than on previous machines.

Still another object is the object of providing a vertical broaching machine which has removable upper and lower guides which can easily be replaced once they have worn beyond permitted tolerances.

These and other objects and advantages will be apparent upon reading the detailed description of the preferred embodiment.

DETAILED DESCRIPTION OF THE PREFERRED EMBODIMENT

Figure 1:
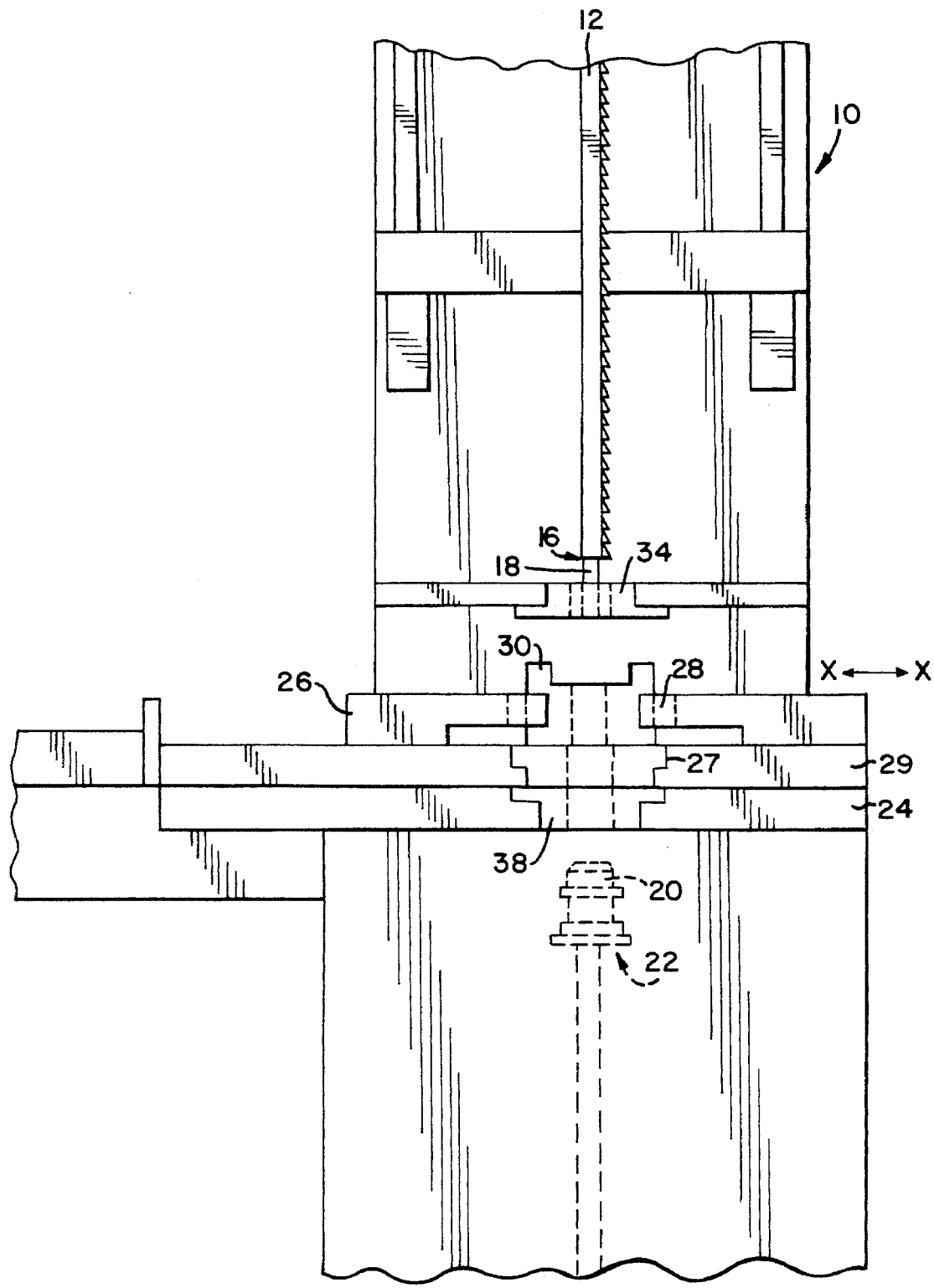
FIG. 1 is a front elevational view with portions removed of the inventive broaching machine.

Turning first to FIG. 1, there is illustrated a broaching machine 10 of the present invention. A vertical broach 12 is retained in a broach holder of standard design at its upper end (not illustrated). The broach is generally of a rectangular design having a length and width in cross section. There are cutting teeth 14 along one side of the broach. A lower end 16 of the broach has a decreased diameter shaft 18 which is received in a broach receiving means 20 on a broach pulling unit 22. The broach pulling unit 22 provides the up and down reciprocating drive means which moves the broach 12 in a vertical cutting orientation. There is a reference bed plate 24 on the broaching machine 10. Resting upon the top of the bed plate 24 is a vise 26 which is mounted on a slide plate 29. The slide plate 29 is generally on guide means or slide rails (not illustrated) and the movement of the vise 26 and slide plate 29 is controlled by a numerical control system commonly known in the industry. Thus, through the numerical control system and drive means, which can be a synchronous motor connected to a gear or screw drive, the vise 26 and slide plate 29 can slide on the bed plate 24 along a single horizontal axis. The movement of the vise 26 can be very accurately controlled. This is illustrated by the arrow X—X in FIG. 1 which is perpendicular to the direction of the vertical reciprocating movement of the broach 12. Furthermore, the direction X—X will be perpendicular to the teeth 14 of the broach 12.

Located at the ends of the vise 26 are a pair of jaws 28 which hold a work piece, piece part or hub 30. The work piece 30 is generally cylindrical in configuration with a central bore. The broaching operation is intended to cut a rectangular keyway in the bore of the work piece 30. The jaws 28 firmly grasp the work piece 30 between them such that the work piece 30 is accurately positioned with respect to the broach 12.

Located on the broaching machine 10 above the bed plate 24 and above the vise 26 is an upper fixed support 32. There is an opening in alignment with the broach 12 which closely receives an upper guide 34. The upper guide has an upper guide passageway 36 through which the broach 12 passes. The dimensions of the upper guide passageway 36 are fractionally greater than the dimensions of the broach 12 such that the sides of the broach 12 (not including the edge having the cutting teeth 14) are closely yet slidably received within the upper guide passageway 36 with the cutting teeth 14 not contacting the guide passageway 36.

On the bed plate 24 is an opening which receives a lower guide 38. Centrally disposed within the lower guide 38 is a lower guide passageway 40 which receives the broach 12 when it passes through the bed plate and is received by the broach pulling unit 22. The dimensions of the lower guide passageway are the same as the upper guide passageway 36 such that the sides of the broach 12 (not including the cutting teeth 14) are closely yet slidably received within the lower guide passageway 40.

Figure 2:
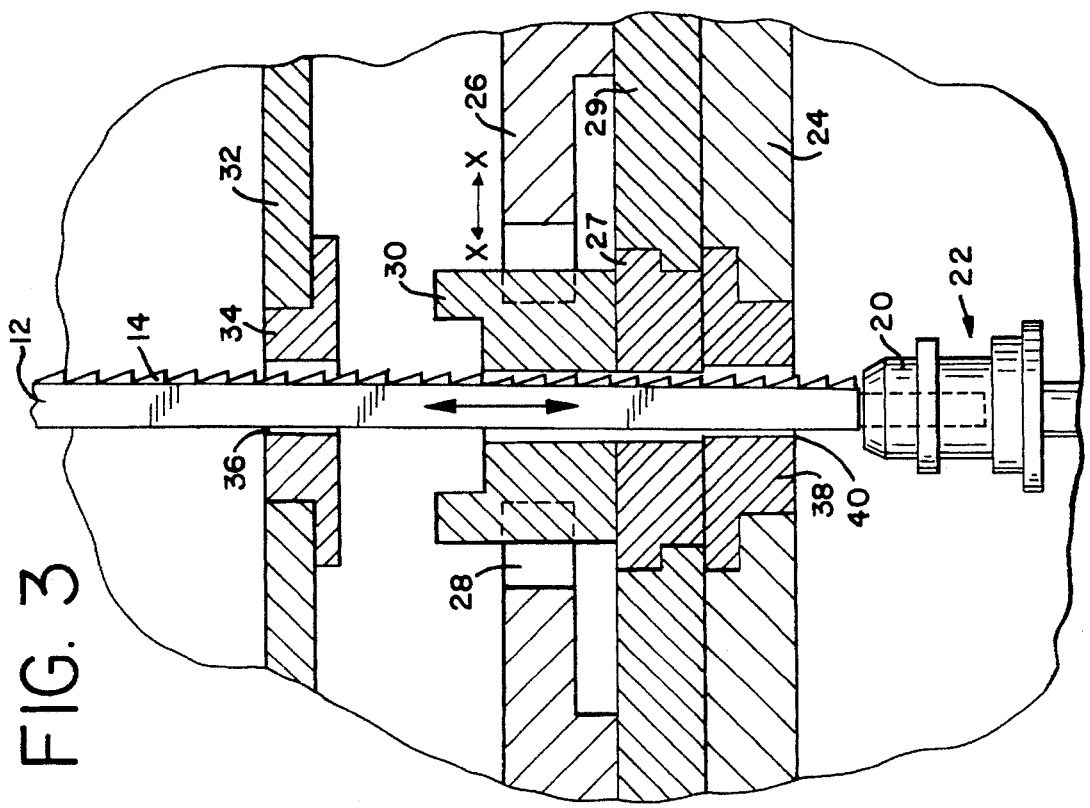
FIG. 2 is an enlarged view with portions removed in cross section of the broach before it is inserted into the work piece.
Figure 3:
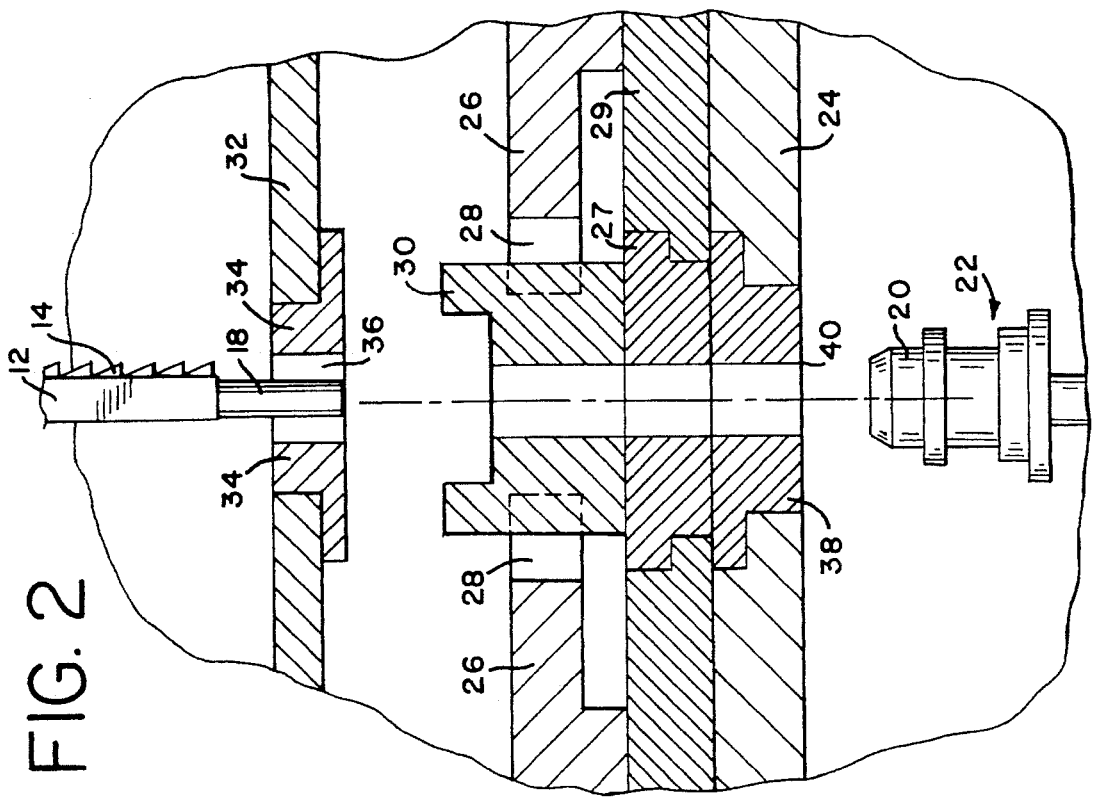
FIG. 3 is similar to FIG. 2 with the broach passing through the work piece and the lower end of the broach being received by the broach pulling unit.

The work piece 30 rests upon a riser 27. As can be seen in FIGS. 2 and 3, the broach 12, upper guide passageway 36, central bore of the work piece, lower guide passageway 40 and broach pulling unit 22 are all in vertical alignment with each other. The upper guide 34 and lower guide 38 maintain the broach in vertical alignment with respect to the central bore of the work piece during the cutting operation.

To begin the cutting operation, work piece 30 is positioned within the jaws 28 of vise 26 on the bed plate 24. The width of the broach and cutting teeth 14 was selected to be the width of the desired keyway in the work piece 30. When the operation begins, the work piece 30 is automatically clamped and positioned to the programmed depth of cut by means of the numerically controlled drive. The numerically controlled drive is programmed to move the vise 26 in the X—X direction the precise amount to have the depth of the keyway cut incrementally into the work piece 30. The broach 12 is then lowered by means of the broach head into the broach receiving means 20. The broach pulling unit 22 pulls the broach through the work piece 30 cutting the keyway. At the end of the downward travel of the broach 12, the pulling unit 22 stops. The work piece 30 is then moved back away from the cutting teeth 14. The pulling unit 22 then pushes the broach up to the broach head where it is withdrawn up through the work piece 30 without contact. The broach is then lowered and this cycle continues incrementally until the vise 26 have moved the work piece 30 the total predetermined distance in the X—X direction which will represent the desired depth of the keyway to be machined. Upon completion of the programmed cycles, the broach is removed from the work piece 30, vise 26 opens and the work piece is removed to be replaced with another such that the broaching operation can be repeated.

This provides a unique method of metal removal. The broach is lowered and pulled by the pulling unit after the work piece has moved into position for engagement with the teeth on the broach. Metal is removed only during the downward movement cycle of the broach. At the end of the downward stroke, the work piece is pulled away from engagement with the broach and the broach is raised without contacting the work piece. The cycle repeats until the proper depth is cut into the work piece. Using this cycling or step process eliminates the need for very long broaches as it performs as a single broach making multiple passes.

In this manner, the desired amount of material is removed from the work piece each time. When each cutting cycle is completed, the broach is raised from the work piece after the work piece has been moved and is no longer in contact with the broach. Thus, inadvertent and unnecessary removal of material from the keyway does not occur because the work piece is moved away from the broach before the broach is vertically withdrawn from the work piece. This increases the accuracy of the keyways as they are cut.

The broach is generally made of steel. The upper guide 34 and lower guide 38 are made of cast iron. The interface between the broach 12 and the upper and lower guides 34, 38 are such that the guides provide a wear surface which does not require a lubricant but will provide sliding movement of the broach within the guide passageways. Eventually, the upper and lower guides must be replaced due to wearing away of the guide passageways. However, the upper guide 34 and lower guide 38 can easily be removed from the fixed upper support 32 and bed plate 24 and replaced with a new upper guide 34 and lower guide 38 such that the broach will continue to machine parts within predetermined tolerances.

Thus, there has been provided a vertical broaching machine and method of broaching which fully satisfies the objects, aims and advantages as set forth above. It is evident that many alternatives, modifications and variations will be apparent to those skilled in the art. Accordingly, it is intended to embrace such variations as fall within the spirit and broad scope of the appended claims.

What is claimed is:

1. A broaching machine for cutting keyways in a bore of a piece part comprising:

a vertically disposed broach with cutting teeth thereon;

a stationary bed plate;

a moveable vise mounted for sliding movement with respect to the stationary bed plate;

jaws on the moveable vise to hold the piece part in alignment with the broach;

drive means operatively connected to the vise for incrementally moving the piece part a controlled amount towards the cutting teeth of the broach along a singular horizontal axis;

an upper fixed support disposed above the stationary bed plate;

a broach holder disposed above the upper fixed support and moveable vertically with respect thereto;

upper broach guide means in the upper fixed support;

lower broach guide means in the bed plate in alignment with the upper broach guide means, the broach vertically aligned with both the upper broach guide means and lower broach guide means;

a broach pulling unit below the stationary bed plate and moveable vertically with respect thereto, the broach pulling unit moving the broach vertically up and down during the cutting operation;

the broach passing through the bore of the piece part, guided by the upper and lower broach guide means, with the depth of the cut of the keyway controlled by the incremental movement of the vise along the horizontal axis.

2. The broaching machine of claim 1 wherein the upper and lower broach guide means have a guide way which closely and slidably receives the broach allowing the broach to move vertically up and down and laterally within the guide way tolerances.

3. The broaching machine of claim 2 wherein the broach is made of steel and the upper and lower broach guide means are made of cast iron with the broach guide means creating a wear surface as the broach slides against the broach guides during the cutting operation.

4. The broaching machine of claim 1 and further comprising means to hold the broach stationary while the drive means moves the vise along the horizontal axis in a direction away from the cutting edge of the broach after the desired amount of material has been removed from the piece part.

5. The broaching machine of claim 1 wherein the drive means moves the piece part incrementally a predetermined amount toward the broach with each reciprocation of the broach.

6. A vertical broaching machine for removing metal from the inside bore of a work piece comprising:

a single broach vertically disposed with respect to the bore of the work piece, the broach having a rectangular cross section, with one side having cutting teeth disposed thereon;

a stationary bed plate;

a vise mounted for sliding movement with respect to the bed plate;

drive means operatively connected to the vise for moving the vise perpendicularly with respect to the vertical axis of the broach;

upper broach guide means mounted above the stationary bed plate;

lower broach guide means mounted below the work piece, the upper and lower broach guide means vertically aligned with respect to the broach, the upper broach guide means and lower broach guide means having a guide way therein which closely and slidably receives the sides of the broach, the cutting teeth of the broach not contacting the guide means;

means on the vise to firmly hold the work piece;

a broach pulling unit below the stationary bed plate, the broach pulling unit receiving the bottom of the broach and imparting vertical movement to the broach;

the broach passing through the bore of the work piece, its lateral movement guided by the upper and lower broach guide means with the amount of metal removed from the work piece controlled by the movement of the vise into the broach as the broach moves up and down.

7. The broaching machine of claim 6 wherein the broach is made of steel and the upper and lower broach guide means are made of cast iron with the broach guide means creating a wear surface as the broach slides against the broach guides during the cutting operation.

8. The broaching machine of claim 6 wherein the broach is held stationary while the drive means moves the work piece away from the broach after the desired amount of metal has been removed from the work piece.

9. The broaching machine of claim 6 wherein the drive means incrementally moves the work piece a predetermined amount toward the cutting teeth on the broach with each reciprocation of the broach.

10. A method of removing metal from a work piece comprising the steps of:

(a) providing a stationary bed plate;

(b) placing a moveable vise on the stationary bed plate;

(c) clamping the work piece in the vise;

(d) incrementally moving the vise a controlled amount towards the cutting edge of the broach along a singular horizontal axis;

(e) guiding the broach by means of an upper guide means, and a lower guide means positioned above and below the work piece;

(f) receiving the broach in a broach pulling unit located below the lower guide means;

(g) pulling the broach vertically downward with the cutting teeth on the broach cutting into the work piece;

(h) stopping the broach at the end of its downward travel;

(i) moving the work piece away from and out of engagement with the broach;

(j) retracting the broach vertically while out of engagement with the work piece;

(k) repositioning the work piece under the broach so that additional material can be cut;

(l) repeating steps (g) through (j) until the desired amount of metal has been removed.

11. The method of claim 10 and further comprising the step of providing a numerically controlled drive connected to the vise for controlling its movement.

12. The method of claim 10 and further providing a rectangular guide way in the upper and lower guide means to closely and slidably receive the broach allowing the broach to move vertically up and down and laterally within the guide way tolerances.

* * * * *